(12) United States Patent
Oya

(10) Patent No.: US 11,645,895 B2
(45) Date of Patent: May 9, 2023

(54) QUEUE ANALYSIS APPARATUS USING A VIDEO ANALYSIS

(71) Applicant: CANON KABUSHIKI KAISHA, Tokyo (JP)

(72) Inventor: Takashi Oya, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/527,677

(22) Filed: Nov. 16, 2021

(65) Prior Publication Data

US 2022/0165137 A1    May 26, 2022

(30) Foreign Application Priority Data

Nov. 25, 2020  (JP) .............................. JP2020-195091

(51) Int. Cl.
| | |
|---|---|
| *G08B 5/36* | (2006.01) |
| *G08B 21/24* | (2006.01) |
| *G06V 20/52* | (2022.01) |
| *G06V 40/10* | (2022.01) |
| *G06V 40/16* | (2022.01) |

(52) U.S. Cl.
CPC .............. *G08B 5/36* (2013.01); *G06V 20/52* (2022.01); *G06V 40/10* (2022.01); *G06V 40/161* (2022.01); *G08B 21/245* (2013.01)

(58) Field of Classification Search
CPC ........ G08B 5/36; G08B 21/245; G08B 21/22; G06V 20/52; G06V 40/10; G06V 40/161; G06V 20/53
See application file for complete search history.

(56) References Cited

FOREIGN PATENT DOCUMENTS

| | | | |
|---|---|---|---|
| JP | 2002099385 A | * | 4/2002 |
| JP | 2004287752 A | | 10/2004 |
| JP | 2005216217 A | | 8/2005 |
| JP | 2007317052 A | | 12/2007 |
| JP | 2008217289 A | | 9/2008 |
| JP | 4230999 B2 | | 2/2009 |
| JP | 2022025931 A | * | 2/2022 |

* cited by examiner

*Primary Examiner* — An T Nguyen
(74) *Attorney, Agent, or Firm* — Canon U.S.A., Inc. IP Division

(57) ABSTRACT

A queue analysis apparatus includes an acquisition unit, a first detection unit, and a control unit. The acquisition unit acquires an image of an area of a queue, which is captured by an imaging apparatus. The first detection unit detects persons from the image acquired by the acquisition unit. The control unit controls indications of standby positions of the queue so as to be displayed on a floor of the area of the queue so that a spacing between the indications of the standby positions of the queue is determined based on the persons detected by the first detection unit.

15 Claims, 8 Drawing Sheets

QUEUE ANALYSIS APPARATUS USING A VIDEO ANALYSIS

BACKGROUND

Technical Field

The present disclosure relates to a queue analysis apparatus, a queue analysis method, and a program.

Description of the Related Art

Techniques are provided to count the numbers of queuing persons and estimate waiting times in queues through video analysis in facilities including station buildings, airports, retails, and banks.

In counting of the number of queuing persons, in Japanese Patent Laid-Open No. 2008-217289, the number of persons entering a room and the number of persons leaving the room are measured from the moving directions of the persons to calculate the number of persons remaining in the room from the difference between the number of persons entering the room and the number of persons leaving the room. In Japanese Patent Laid-Open No. 2004-287752, the number of persons in an observation area is calculated from the number of persons passing through both ends of the observation area and the number of persons in an image resulting from shooting of the entire area is also concurrently counted to correct the number of persons in the area. In Japanese Patent Laid-Open No. 2005-216217, the area of a moving object in a video shot by a camera, which overlooks the area, is detected and the number of peaks is detected by projecting the area of the moving object to count the number of queuing persons.

In estimation of the waiting time in a queue, in Japanese Patent Laid-Open No. 2007-317052, the areas of moving objects based on the background difference are connected to calculate a queue area. Then, the moving speed of the queue is calculated from information about a velocity field to estimate the waiting time in a queue from the length of the queue area and the moving speed of the queue.

Techniques for display on a floor to prompt persons to act includes a technique disclosed in Japanese Patent No, 4230999, in which the positions of persons are detected with a camera arranged on a ceiling to project graphics on the floor depending on the positions and the actions.

Actions to keep appropriate distances with other persons in daily lives are recommended in recent years with the increasing spread of infection transmitted through droplet infection. Although the number of queuing persons and the waiting time in a queue are estimated in the techniques in Japanese Patent Laid-Open No. 2008-217289, Japanese Patent Laid-Open No, 2004-287752, Japanese Patent Laid-Open No. 2005-216217, Japanese Patent Laid-Open No. 2007-317052, and Japanese Patent No. 4230999, the techniques do not take special action on users to prevent the spread of infection.

SUMMARY

A queue analysis apparatus according to an embodiment of the present disclosure includes an acquisition unit, a first detection unit, and a control unit. The acquisition unit acquires an image of an area of a queue. The image is captured by an imaging apparatus. The first detection unit detects persons from the image acquired by the acquisition unit. The control unit controls indications of standby positions of the queue so as to be displayed on a floor of the area of the queue so that a spacing between the indications of the standby positions of the queue is determined based on the persons detected by the first detection unit.

Further features of the disclosure will become apparent from the following description of exemplary embodiments with reference to the attached drawings.

DESCRIPTION OF THE EMBODIMENTS

The present disclosure is provided to control indications of standby positions of a queue so as to be appropriately displayed based on an image of the area of the queue.

First Embodiment

In a first embodiment, a queue spacing is calculated from a queue length, the number of queuing persons, and a waiting time in a queue to project standby positions. The queue that is controlled with guide poles and so on and that has an entrance and an exit is assumed in the first embodiment. It is also assumed that the spacing between queuing persons may be freely changed by the queuing persons regardless of the presence of markers or seals indicating the standby positions on a floor. The markers or seals are indications or indicators of the standby positions.

Figure 1:
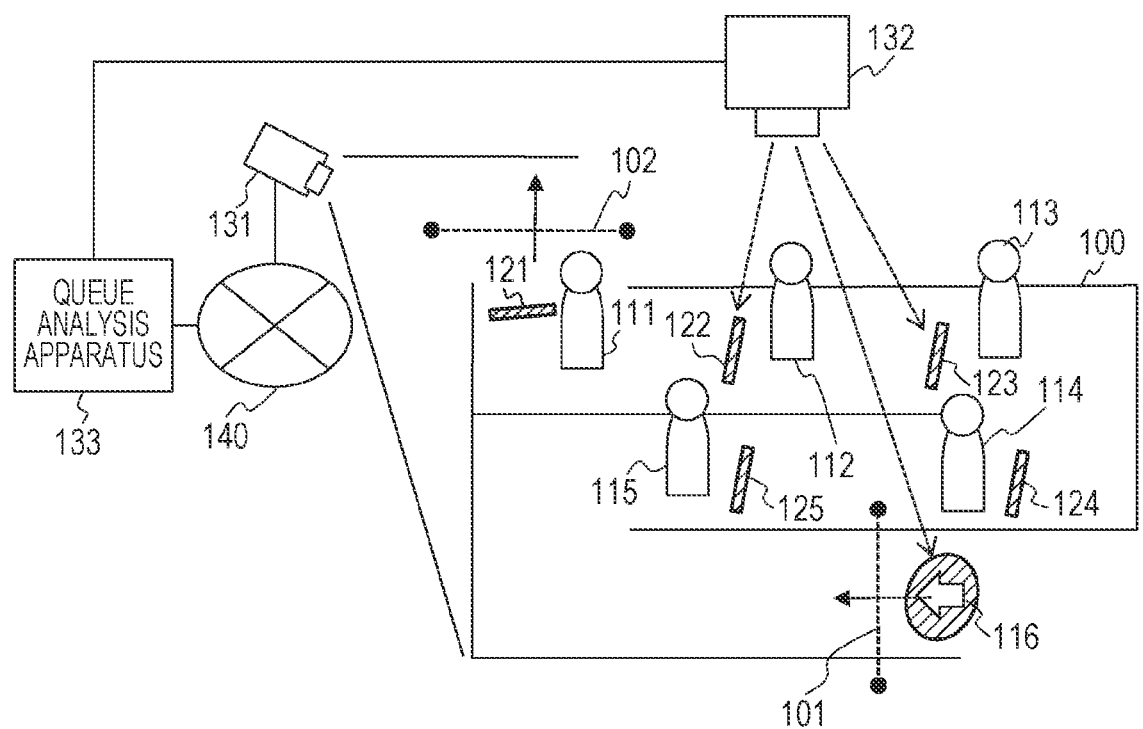
FIG. 1 is a diagram illustrating an example of the configuration of a queue analysis system in a first embodiment.

FIG. 1 is a diagram for describing a queue and a queue analysis system in the first embodiment. Users enter the queue from an entrance 101, move along a guide 100, and exit from an exit 102. In other words, the queue of the users extends along the guide 100 from the exit 102 to the entrance 101. The queue analysis system has a configuration in which an imaging apparatus 131, a projection apparatus 132, and a queue analysis apparatus 133 are connected to each other over a network 140, The queue analysis apparatus 133 is, for example, a personal computer. The imaging apparatus 131 is a network camera and shoots queuing persons 111 to 115 to generate an image. The queue analysis apparatus 133 detects persons in the image generated by the imaging apparatus 131 with a central processing unit (CPU), which executes a program, to count the number of queuing persons. Although the queue analysis system includes one imaging apparatus 131 in FIG. 1, the queue analysis system may include multiple imaging apparatuses. The queue analysis apparatus 133 may partially observe the queue using each of the multiple imaging apparatuses and may add the partial images to calculate the number of queuing persons.

The projection apparatus 132 is a projector and projects graphics 121 to 125 at certain intervals on the floor as the standby positions of the queuing persons 111 to 115 under the control of the queue analysis apparatus 133. The graphics 121 to 125 are graphics are indications or indicators that indicate the standby positions. Although the bar-shaped graphics 121 to 125 are illustrated in FIG. 1 as the graphics indicating the standby positions, the graphics 121 to 125 may be formed into an elliptical shape. In addition, the projection apparatus 132 projects a graphic 116 indicating whether the entrance of persons is permitted or not near the entrance 101 of the queue. The projection apparatus 132 displays, as the graphic 116, an "←" or the like if the entrance is permitted and a "×" or the like if the entrance is not permitted.

Figure 2:
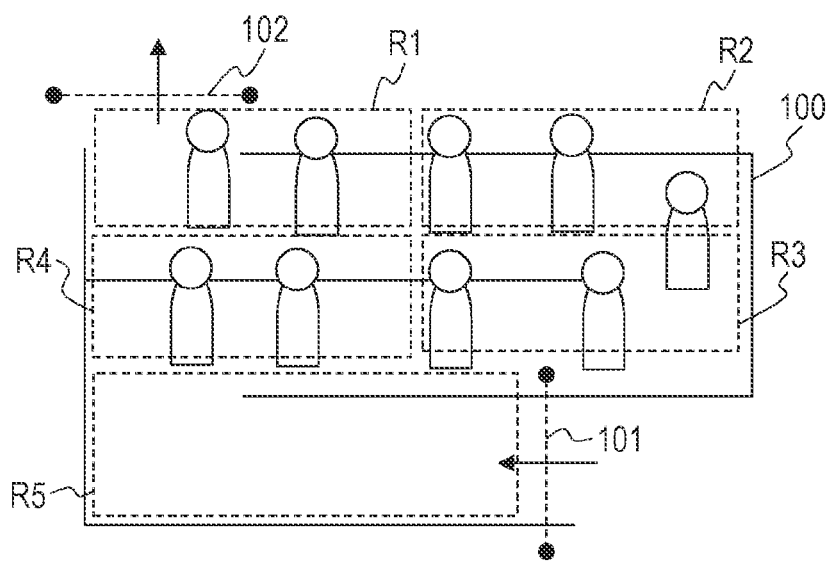
FIG. 2 is a diagram for describing a method of measuring the number of queuing persons and a queue length in the first embodiment.

FIG. 2 is a diagram for describing a method of measuring the number of queuing persons and the queue length. In a queue, a dense state occurs when the spacings between a certain person and the persons before and after the certain person are made smaller and an infection risk is increased. An infection risk is a risk of being infected by a disease-carrying or causing agent such as virus or bacteria. For contagious diseases, the disease may spread through contact or by air. Therefore, in a confined area with people as in a queue, the risk of infection increases as the spacings or distances among the people are small. One way to prevent the spreading of the virus or bacteria, especially those that are airborne, is to wear mask. The more people wear masks, the less the infection risk becomes. An average spacing Davr between a certain person and the persons before and after the certain person in the entire queue is calculated according to Equation (1) by the queue analysis apparatus 133. In Equation (1), L denotes the queue length and N denotes the number of queuing persons.

$$Davr = L/(N-1) \qquad (1)$$

In Equation (1), the number-of-queuing-persons N is the sum of the numbers of persons in the queue and is equal to a difference Nin-Nout between a number-of-entrance-persons Nin passing through the entrance 101 of the queue and a number-of-exit-persons Nout passing through the exit 102 of the queue. Alternatively, the total number of persons detected in areas R1 to R5 on the path of the queue may be used as the number-of-queuing-persons N.

In Equation (1), the queue length L is a distance along the path from the beginning of the queue to the end thereof. Referring to FIG. 2, the queue length is allocated to each of the areas R1 to R5 on the path. Then, the queue analysis apparatus 133 performs a person detection process in the respective areas R1 to R5 to calculate an area having the maximum value of n, among areas Rn in which persons at rest exist, from the areas R1 to R5. Finally, the queue analysis apparatus 133 sequentially adds the queue lengths from the area R1 to the area. Rn to calculate the entire queue length L. The queue analysis apparatus 133 may individually measure the positions of the queuing persons and may calculate the distances between the persons to calculate the entire queue length L. The method of calculating the queue length L is not limited to the above ones.

Figure 3A:
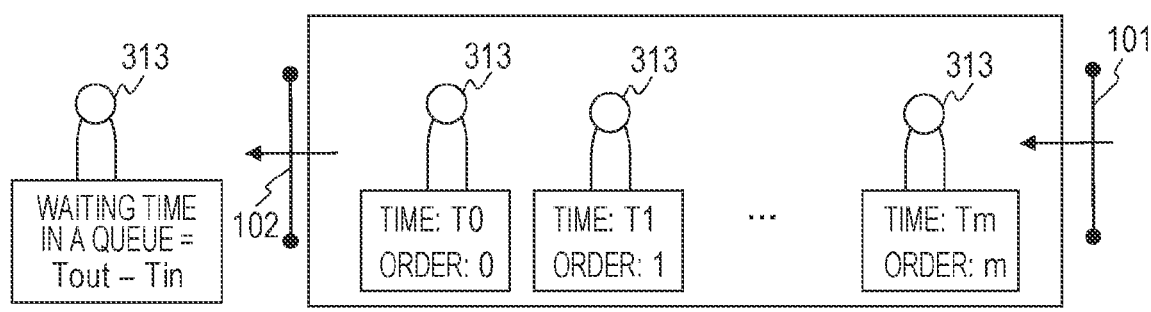
FIG. 3A is a diagram for describing a method of estimating a waiting time in a queue in the first embodiment.
Figure 3B:
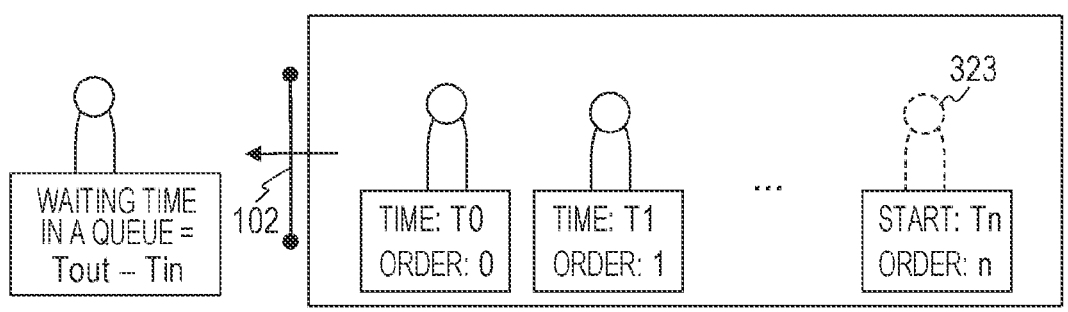
FIG. 3B is a diagram for describing another method of estimating the waiting time in a queue in the first embodiment.

FIG. 3A and FIG. 3B are diagrams for describing methods of estimating the "waiting time in a queue" of a queue in the first embodiment. Here, the "waiting time in a queue" is the time period from the time when a certain person enters the queue (passes through the entrance 101) to the time when the certain person exits from the queue (passes through the exit 102). Two methods of calculating the waiting time in a queue will now be described with reference to FIG. 3A and FIG. 3B.

FIG. 3A is a diagram for describing a first method of calculating the waiting time in a queue and illustrates a queue model in which an entrance time Tin, an exit time Tout, and the number-of-queuing-persons N are capable of being observed. This queue model has the entrance time Tin and an order M for each queuing person. The entrance time Tin is the time when a person 313 passes through the entrance 101. The order M is the number of persons before the person 313 when the person 313 enters the queue and is equal to the number-of-queuing-persons N immediately before the person 313 enters the queue. The exit time Tout is the time when the person 313 passes through the exit 102.

Information about a person is newly generated when the passing of the person through the entrance 101 is detected, and the entrance time Tin and the order M is set in the information. Then, when the passing of one person through the exit 102 is detected, the order M in the queue model is advanced to decrease the order M by one. When M=0, the person next exits. When the passing of the person through the exit 102 is detected in this state, the queue analysis apparatus 133 calculates a waiting-time-in-a-queue Tw from the difference Tout-Tin between the entrance time Tin and the exit time Tout according to Equation (2):

$$Tw = Tout - Tin \qquad (2)$$

FIG. 3B is a diagram for describing a second method of calculating the waiting time in a queue and illustrates a queue model in which the exit time Tout and the number-of-queuing-persons N are capable of being observed. In this queue model, the queue analysis apparatus 133 does not detect the entrance time Tin when the person passes through the entrance but detects a person 323 who newly enters the queue from the variation in the number-of-queuing-persons N. Specifically, the queue analysis apparatus 133 periodically detects a number-of-queuing-persons N(t) and calculates the number-of-entrance-persons Nin from a previous number-of-queuing-persons N(t−1) and the number-of-exit-persons Nout from the previous detection to the current detection according to Equation (3):

$$Nin = N(t) - N(t-1) - Nout \qquad (3)$$

The number-of-queuing-persons N(t) is the number-of-queuing-persons N that is currently detected. The number-of-queuing-persons N(t−1) is the number-of-queuing-persons N that was previously detected. The number-of-exit-persons Nein is the number of persons who has exited from the queue from the detection time of the previous number-of-queuing-persons N(t−1) to the detection time of the current number-of-queuing-persons N(t) (the number of persons who has passed through the exit 102). The number-of-entrance-persons Nin is the number of persons who has entered the queue from the detection time of the previous number-of-queuing-persons N(t−1) to the detection time of the current number-of-queuing-persons N(t) (the number of persons who has passed through the entrance 101).

The queue analysis apparatus 133 adds information about the person who newly enters the queue, which corresponds to the number-of-entrance-persons Nin, to the queue model if the number-of-entrance-persons Nin has a positive value. The process after the addition of the information to the queue model is the same as the first method. The queue analysis apparatus 133 calculates the waiting-time-in-a-queue Tw, as in the first method, after detecting the passing of the person through the exit 102.

Comparison between the first method and the second method indicates that the person who newly enters the queue is capable of being added to the queue model with no delay upon detection of the passing of the person through the entrance 101 in the first method. In contrast, in the second method, since the person who newly enters the queue is capable of being added to the queue model only at the timing when the number-of-queuing-persons N(t) is detected, any delay occurs. As a result, the second method is applicable to a case in which the entrance of the queue is not accurately defined, compared with the first method, but the estimation accuracy of the waiting-time-in-a-queue Tw is degraded in the second method. The queue analysis apparatus 133 is capable of calculating an average-waiting-time-in-a-queue Tavr of the waiting-time-in-a-queue Tw by detecting a certain number of persons in both the first method and the second method.

It is estimated in a queue that an infection risk R is increased as the spacings between a person and the persons before and after the person are made small and as the waiting-time-in-a-queue Tw is increased. The infection risk R is represented by Equation (4), where C denotes a constant, Tavr denotes the average waiting time in a queue, and Davr denotes the average spacing of the queue.

$$R=CTavr/Davr \qquad (4)$$

The constant C is a normalized constant to put the infection risk R in a range from zero to one and is experimentally determined. Adjusting the average spacing Davr of the queue so that the infection risk R is lower than or equal to a threshold value Rth, as in Inequality (5), ensures the safety of the queue.

$$Davr \geq CTavr/Rth \qquad (5)$$

According to Inequality (5), the queue analysis apparatus 133 adjusts the graphics 121 to 125 projected by the projection apparatus 132 so as to increase the average spacing Davr of the queue when the average-waiting-time-in-a-queue Tavr is increased. Specifically, the queue analysis apparatus 133 prepares in advance multiple projection patterns of the graphics 121 to 125 of the standby positions corresponding to the average spacing Davr of the queue and updates the projection of the projection pattern closest to the average spacing Davr of the queue, calculated according to Inequality (5). The projection patterns may be periodically updated or may be updated at the timing when the person moves. The queue analysis apparatus 133 may vary the display mode of the standby positions by blinking the graphics 121 to 125 or changing the colors of the graphics 121 to 125 as a device for display when the projection patterns are varied. This is friendly to the users.

Since the queue length F is increased as the average spacing Davr of the queue is increased, the queue may not be fit within the length of the guide 100. In such a case, the queue analysis apparatus 133 changes the graphic 116 projected near the entrance 101 to a graphic indicating an entrance inhibited state to inhibit the person from newly entering the queue. In addition, since the effect of reducing the infection risk R owing the increase in the average spacing Davr of the queue is peaked if the average spacing Davr of the queue is greater than or equal to a predetermined value, the queue analysis apparatus 133 sets the maximum value of the average spacing Davr of the queue.

Figure 8:
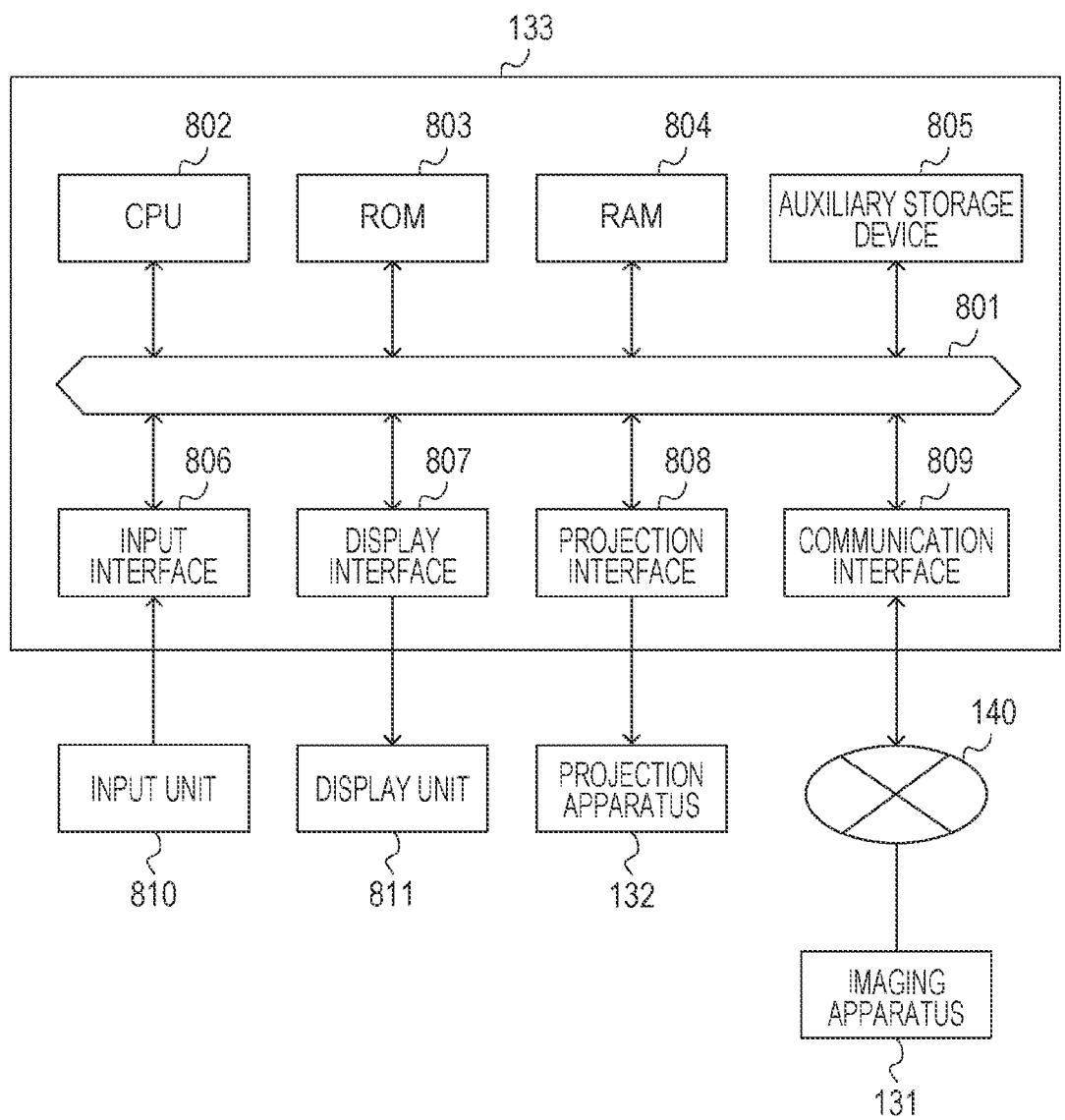
FIG. 8 is a block diagram illustrating an example of the hardware configuration of the queue analysis apparatus.

FIG. 8 is a block diagram illustrating an example of the hardware configuration of the queue analysis apparatus 133. The queue analysis apparatus 133 is, for example, a personal computer. Referring to FIG. 8, the queue analysis apparatus 133 includes a bus 801, a CPU 802, a read only memory (ROM) 803, a random access memory (RAM) 804, an auxiliary storage device 805, an input interface 806, a display interface 807, a projection interface 808, and a communication interface 809.

The CPU 802 executes programs stored in the ROM 803, the RAM 804, and the auxiliary storage device 805 to control the respective components for processing. The ROM 803 is a non-volatile memory storing the programs executed by the CPU 802 and so on. The RAM 804 functions as a main memory, a working area, and so on of the CPU 802. The CPU 802 loads the programs from the ROM 803 or the auxiliary storage device 805 onto the RAM 804 and executes the programs to realize functional operations. The program execution causes the CPU to perform operations described in the above or in the flowcharts, such that the CPU functions as the various units. The term "unit" may refer to a hardware component or a software module, a function, a subroutine, or an application.

The auxiliary storage device 805 is, for example, a hard disk device, a solid-state drive device, a memory card, a compact disk (CD) drive device, or a digital versatile disk (DVD) drive device. The auxiliary storage device 805 stores the programs executed by the CPU 802, a variety of data, a variety of information, and so on. In addition, the auxiliary storage device 805 stores a variety of data, a variety of information, and so on, which are generated in the processing by the CPU 802.

The input interface 806 is connected to an input unit 810. The input unit 810 is, for example, a key board, a mouse, or a touch panel. The display interface 807 is connected to a display unit 811, The display unit 811 is, for example, a liquid crystal display device. The projection interface 808 is connected to the projection apparatus 132. The communication interface 809 is connected to the imaging apparatus 131 over the network 140.

The CPU 802 is capable of realizing part or all of the functions of the queue analysis apparatus 133 by executing the programs. However, at least part of the functions of the queue analysis apparatus 133 may be realized by dedicated hardware. In this case, the dedicated hardware operates under the control of the CPU 802.

Figure 4:
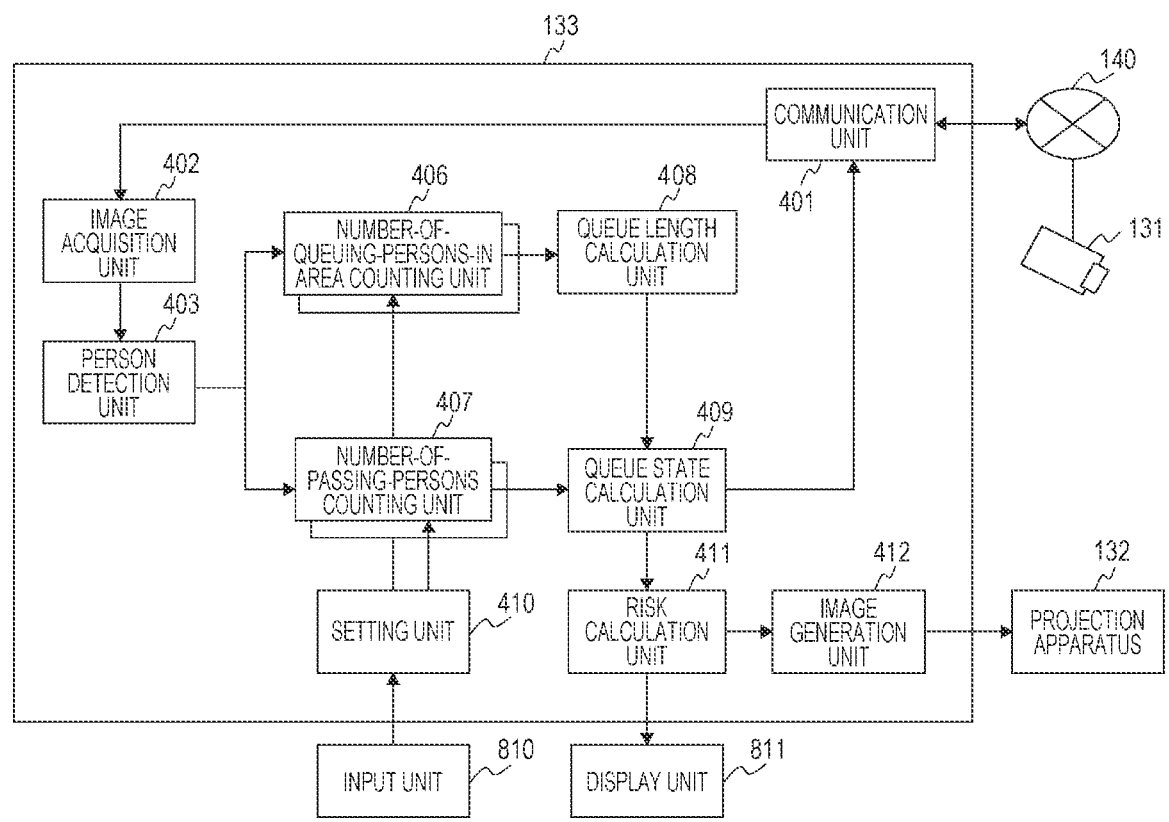
FIG. 4 is a block diagram illustrating an example of the functional configuration of a queue analysis apparatus according to the first embodiment.

FIG. 4 is a block diagram illustrating an example of the functional configuration of the queue analysis apparatus 133 according to the first embodiment. The queue analysis apparatus 133 realizes the respective functional components in FIG. 4 by executing the programs with the CPU 802. Referring to FIG. 4, the queue analysis apparatus 133 includes a communication unit 401, an image acquisition unit 402, a person detection unit 403, a number-of-queuing-persons-in area counting unit 406, a number-of-passing-persons counting unit 407, a queue length calculation unit 408, a queue state calculation unit 409, a setting unit 410, a risk calculation unit 411, and an image generation unit 412. The input unit 810, the display unit 811, and the projection apparatus 132 are connected to the queue analysis apparatus 133.

The communication unit 401 receives an image captured by the imaging apparatus 131 over the network 140. The image acquisition unit 402 acquires the image from the imaging apparatus 131 via the communication unit 401. The image to be acquired does not depend on a specific image format or compression format. The person detection unit 403 detects the positions of persons in the image acquired by the image acquisition unit 402 and performs association of the same person between continuous frames. The person detection unit 403 is capable of using a method of detecting the shape of the upper body of each person, a method of detecting the head of each person, or a method of detecting each person through learning of other feature amounts of the person. The person detection unit 403 does not depend on a specific person detecting method.

The number-of-queuing-persons-in area counting unit 406 counts the number-of-queuing-persons N existing in the detection areas R1 to R5 based on the persons detected by the person detection unit 403. The number-of-passing-persons counting unit 407 detects passing of the persons through the entrance 101 and the exit 102 of the queue based on the persons detected by the person detection unit 403 to count the numbers of persons passing through the entrance 101 and the exit 102.

The queue length calculation unit 408 calculates the queue length L using the number-of-queuing-persons N counted by the number-of-queuing-persons-in area counting unit 406. The queue state calculation unit 409 calculates the average spacing Davr of the queue and the average-waiting-time-in-a-queue Tavr of the queue based on observation results including the queue length L, the number-of-queuing-persons N, and the times when the persons pass through the entrance 101 and the exit 102.

The risk calculation unit 411 calculates the infection risk R of the queue based on the average spacing Davr of the queue and the average-waiting-time-in-a-queue Tavr of the queue according to Equation (4), Then, the risk calculation unit 411 displays the average spacing Davr of the queue, the average-waiting-time-in-a-queue Tavr of the queue, and the infection risk R of the queue in the display unit 811. Then, the risk calculation unit 411 calculates a control target value of the average spacing Davr of the queue based on the average spacing Davr of the queue, the average-waiting-time-in-a-queue Tavr of the queue, and the threshold value Rth according to Inequality (5) to supply the control target value of the average spacing Davr of the queue to the image generation unit 412.

The image generation unit 412 adjusts the spacing between the graphics 121 to 125 based on the control target value of the average spacing Darr of the queue, generates an image including the graphics 121 to 125, and supplies the generated image to the projection apparatus 132. The projection apparatus 132 projects the image including the graphics 121 to 125 on the floor.

The setting unit 410 sets the passing detection lines of the entrance 101 and the exit 102 and the detection areas R1 to R5 depending on the input with the input unit 810. Then, the setting unit 410 supplies the passing detection lines of the entrance 101 and the exit 102, which are set, to the number-of-passing-persons counting unit 407 and supplies the detection areas R1 to R5, which are set, to the number-of-queuing-persons-in area counting unit 406.

Figure 5:
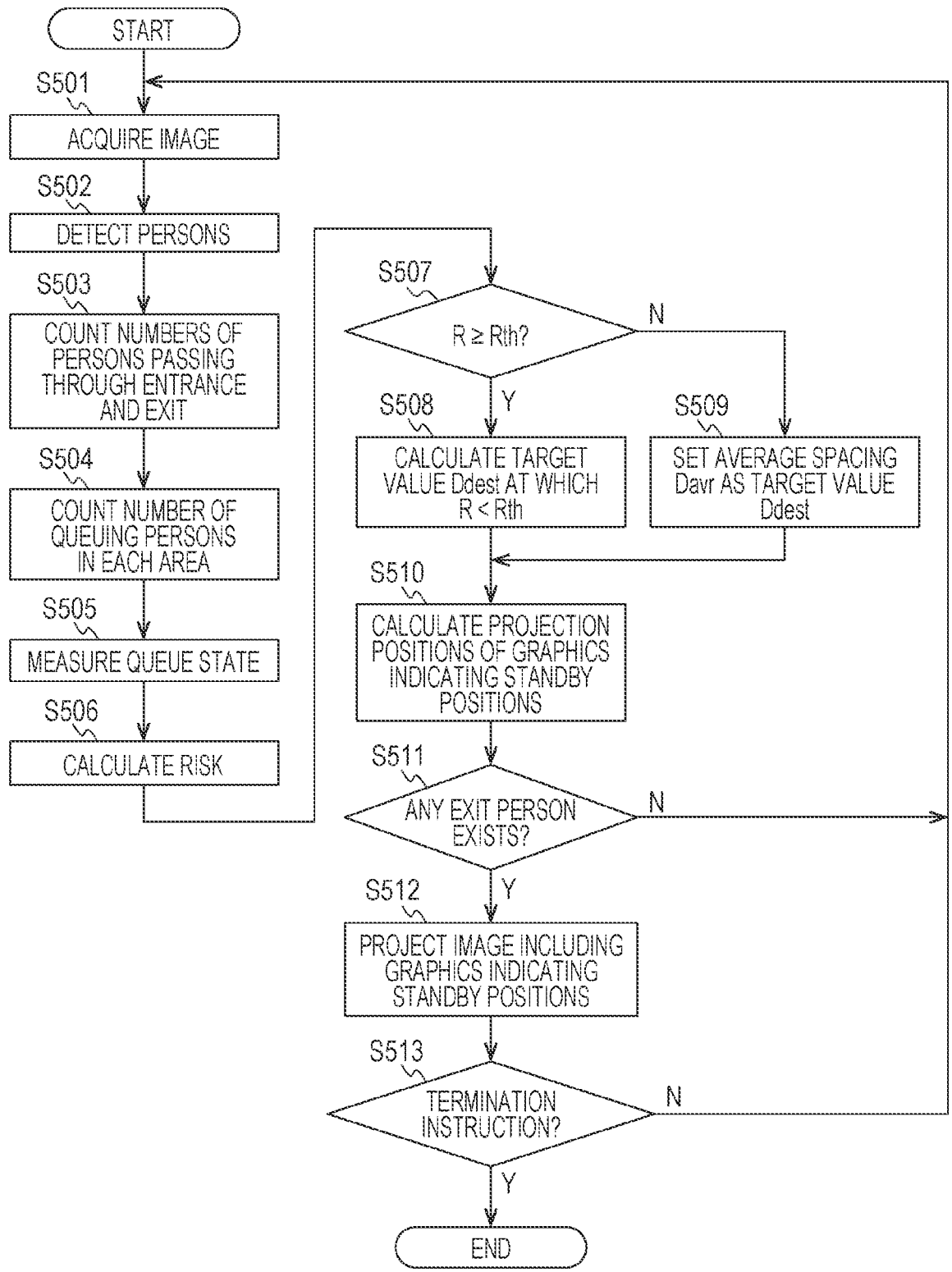
FIG. 5 is a flowchart illustrating a process of a queue analysis method according to the first embodiment.

FIG. 5 is a flowchart illustrating a process of a queue analysis method performed by the queue analysis apparatus 133. Referring to FIG. 5, in Step S501, the image acquisition unit 402 acquires an image of the area of a queue, which is captured by the imaging apparatus 131, via the communication unit 401. In Step S502, the person detection unit 403 detects persons in the image acquired by the image acquisition unit 402, In Step S503, the number-of-passing-persons counting unit 407 counts the numbers of persons passing through the entrance 101 and the exit 102 of the queue based on the persons detected by the person detection unit 403. In Step S504, the number-of-queuing-persons-in area counting unit 406 counts the number-of-queuing-persons N in each of the detection areas R1 to R5 based on the persons detected by the person detection unit 403.

In Step S505, the queue length calculation unit 408 calculates the queue length L using the number-of-queuing-persons N counted by the number-of-queuing-persons-in area counting unit 406. The queue state calculation unit 409 calculates the average spacing Davr of the queue and the average-waiting-time-in-a-queue Tavr of the queue based on the queue length L, the number-of-queuing-persons N, and the numbers of persons passing through the entrance 101 and the exit 102 according to Equation (1) and Equation (2).

The first method of calculating the waiting time in a queue in FIG. 3A will now be described. The queue state calculation unit 409 calculates the waiting-time-in-a-queue Tw from the difference between the entrance time Tin when the person passes through the entrance 101 of the queue and the exit time Tout when the person passes through the exit 102 of the queue according to Equation (2).

The second method of calculating the waiting time in a queue in FIG. 3B will now be described. The queue state calculation unit 409 calculates the number-of-entrance-persons Nin of the queue based on the number-of-queuing-persons N(t) that is currently detected, the number-of-queuing-persons N(t−1) that was previously detected, and the number-of-exit-persons Nout that has been passed through the exit 102 of the queue between the current detection and the previous detection according to Equation (3). If the number-of-entrance-persons Nin of the queue has a positive value, the queue state calculation unit 409 calculates the waiting-time-in-a-queue Tw from the difference between the entrance time Tin of the person and the exit time Tout when the person passes through the exit 102 of the queue according to Equation (2).

In Step S506, the risk calculation unit 411 calculates the infection risk R of the queue based on the average spacing Davr of the queue and the average-waiting-time-in-a-queue Tavr of the queue according to Equation (4). Then, the risk calculation unit 411 displays the average spacing Davr of the queue, the average-waiting-time-in-a-queue Tavr of the queue, and the infection risk R of the queue in the display unit 811.

In Step S507, the risk calculation unit 411 determines whether the infection risk R is higher than or equal to the threshold value Rth. If the infection risk R is higher than or equal to the threshold value Rth (YES in Step S507), the process goes to Step S508. If the infection risk R is lower than the threshold value Rth (NO in Step S507), the process goes to Step S509.

In Step S508, the risk calculation unit 411 calculates the average spacing Davr of the queue at which the infection risk R is lower than the threshold value Rth as a control target value Ddest. Then, the process goes to Step S510.

In Step S509, the risk calculation unit 411 sets the average spacing Davr of the queue as the control target value Ddest. Then, the process goes to Step S510.

In Step S510, the image generation unit 412 calculates the projection positions of the graphics 121 to 125 so that the spacing between the graphics 121 to 125 indicating the standby positions of the queue is equal to the control target value Ddest.

In Step S511, the queue state calculation unit 409 determines whether any exit person who has passed through the exit 102 exists based on the number of persons who have passed through the exit 102, If no exit person exists (NO in Step S511), the process goes back to Step S501. If any exit person exists (YES in Step S511), the process goes to Step S512.

In Step S512, the image generation unit 412 adjusts the positions of the graphics 121 to 125 based on the projection positions of the graphics 121 to 125 calculated in Step S510, selects or generates an image including the graphics 121 to 125, and supplies the selected or generated image to the projection apparatus 132. The projection apparatus 132 projects the image including the graphics 121 to 125 indicating the standby positions of the queue on the floor.

The image generation unit 412 functions as a controller, which controls the graphics 121 to 125 so as to be displayed on the floor of the area of the queue so that the spacing between the graphics 121 to 125 indicating the standby positions of the queue based on the average-waiting-time-in-a-queue Thvr of the queue, calculated by the queue state calculation unit 409, is achieved. The graphic 116 and the graphics 121 to 125 are not limited to the graphics and may be marks including graphics, letters, symbols, or the likes. The image generation unit 412 controls the spacing between the graphics 121 to 125 so that the spacing between the graphics 121 to 125 is increased as the average-waiting-time-in-a-queue Tavr of the queue is increased, as indicated in Inequality (5).

In Step S513, the setting unit 410 determines whether a termination instruction is input based on the input with the input unit 810. If the termination instruction is not input (NO in Step S513), the process goes back to Step S501. If the termination instruction is input (YES in Step S513), the process in the flowchart in FIG. 5 is terminated.

If the queue length L is lower than a threshold value, the image generation unit 412 controls the graphic (mark) 116 indicating that the entrance to the area of the queue is permitted so as to be displayed on the floor of the area of the entrance 101 in the area of the queue. If the queue length L is higher than or equal to the threshold value, the image generation unit 412 controls a graphic (mark) indicating that the entrance to the area of the queue is inhibited so as to be displayed on the floor of the area of the entrance 101 in the area of the queue.

As described above, according to the first embodiment, the queue analysis apparatus 133 determines the dense state of the queue from the queue length L and the number-of-queuing-persons N. As a result, it is possible for a facility, administrator to know the state of the queue and take appropriate measures based on the dense state. This reduces the infection risk R during the waiting time in a queue.

The queue analysis apparatus 133 adjusts the positions of the graphics 121 to 125 indicating the standby positions so that the users keep an appropriate distance based on the variety of information about the queue, which is acquired through analysis of a video shot by the imaging apparatus 131. The queue analysis apparatus 133 is capable of adjusting the positions of the graphics 121 to 125 indicating the standby positions so that as many persons as possible can use the facility while ensuring the safety of the users. The queue analysis apparatus 133 dynamically controls the positions of the graphics 121 to 125 indicating the standby positions based on the state of the queue to enable as many persons as possible to use the facility while reducing the infection risk R of the users.

First Modification

In a first modification, the queue analysis apparatus 133 adjusts increase and decrease of the spacing between the graphics 121 to 125 using the average-waiting-time-in-a-queue Tavr, instead of the use of the infection risk R of the queue according to Equation (4) and Inequality (5), as the method of calculating the spacing between the graphics 121 to 125. Specifically, the queue analysis apparatus 133 increases the total number of the graphics 121 to 125 indicating the standby positions and decreases the spacing between the graphics 121 to 125 indicating the standby positions if the average-waiting-time-in-a-queue Tavr is shorter than a threshold value. The queue analysis apparatus 133 decreases the total number of the graphics 121 to 125 indicating the standby positions and increases the spacing between the graphics 121 to 125 indicating the standby positions if the average-waiting-time-in-a-queue Tavr is longer than the threshold value. The image generation unit 412 controls the number of the graphics 121 to 125 so as to be decreased as the average-waiting-time-in-a-queue Tavr of the queue is increased and controls the spacing between the graphics 121 to 125 so as to be increased as the average-waiting-time-in-a-queue Tavr of the queue is increased.

Second Modification

In a second modification, the method of displaying the graphics 121 to 125 indicating the standby positions on the floor is not limited to the projection of the image by the projection apparatus 132, For example, the queue analysis apparatus 133 may embed a display in the floor to display an image in the display. Alternatively, the queue analysis apparatus 133 may simply arrange light emitting diodes (LEDs) on the floor to form a display unit and may cause the LEDs of a portion composing the graphics 121 to 125 indicating the standby positions to emit light.

In other words, the image generation unit 412 is capable of controlling the projection apparatus 132 so as to project the graphics 121 to 125 on the floor of the area of the queue. The graphics 121 to 125 function as indications of standby positions. In addition, the image generation unit 412 is capable of controlling the display unit installed in or on the floor of the area of the queue so as to display the graphics 121 to 125. Furthermore, the image generation unit 412 is capable of controlling part of multiple light emitting devices (LEDs) installed in or on the floor of the area of the queue so as to emit light.

Second Embodiment

In a second embodiment, the queue analysis apparatus 133 adjusts the spacing between the graphics 121 to 125 indicating the standby positions in consideration of whether the persons wear masks. Specifically, the queue analysis apparatus 133 lessens the calculation value of the infection risk R depending on the number of persons who wear the masks in the queuing persons to correct the control target value Ddest of the average spacing Davr of the queue. For this, a mask wearing attribute is added the queue models in FIG. 3A and FIG. 3B. The queue analysis apparatus 133 performs a mask detection process at the timings when the person passes through the entrance 101 and the exit 102 of the queue to add or delete the queuing person to the queue model with mask wearing information.

The ratio of the number of persons wearing the masks to the number-of-queuing-persons N is referred to as a mask wearing ratio Cm. The correction is performed so that the average spacing Davr of the queue is increased as the mask wearing ratio Cm is increased. Accordingly, Equation (1) is modified into Equation (6). The queue state calculation unit 409 calculates an average spacing D'avr of the queue based on the queue length L, the number-of-queuing-persons N, and the mask wearing ratio Cm according to Equation (6):

$$D'avr=(1+\alpha Cm)L/(N-1) \quad (6)$$

In Equation (6), $\alpha$ is a parameter indicating the influence of the wearing of the mask on the average spacing D'avr. It is assumed that the average spacing D'avr is up to doubled when $\alpha=1.0$. The infection risk R of the queue is modified from Equation (4) to Equation (7). The risk calculation unit 411 calculates the infection risk R based on the average-waiting-time-in-a-queue Tavr of the queue and the average spacing D'avr of the queue according to Equation (7):

$$R=Tavr/D'avr \quad (7)$$

Figure 6:
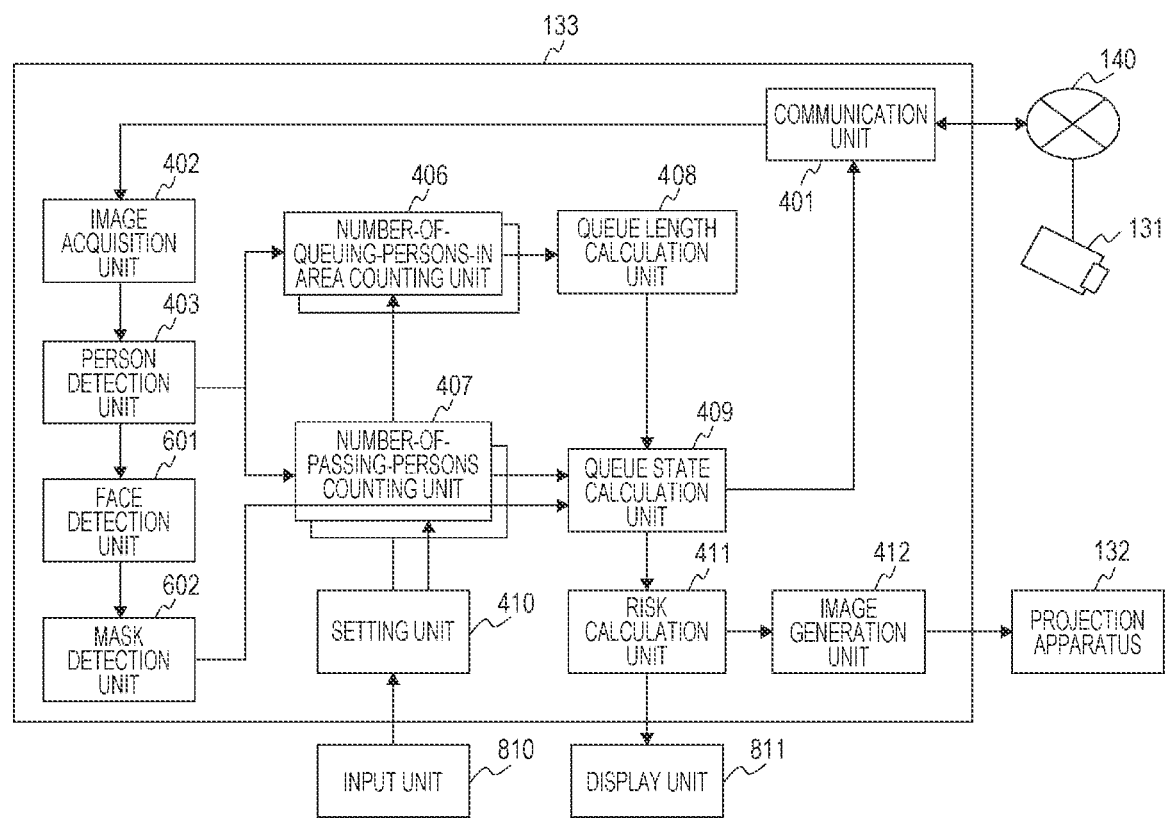
FIG. 6 is a block diagram illustrating an example of the functional configuration of a queue analysis apparatus according to a second embodiment.

FIG. 6 is a block diagram illustrating an example of the functional configuration of the queue analysis apparatus 133 according to the second embodiment. The queue analysis apparatus 133 in FIG. 6 includes a face detection unit 601 and a mask detection unit 602, in addition to the components in the queue analysis apparatus 133 in FIG. 4.

The face detection unit 601 detects a face area for each person detected by the person detection unit 403, The mask detection unit 602 detects whether the person in the face area detected by the face detection unit 601 wears the mask to calculate the mask wearing ratio Cm.

The queue state calculation unit 409 calculates the average spacing D'avr of the queue based on the queue length L, the number-of-queuing-persons N, and the mask wearing ratio Cm according to Equation (6). The risk calculation unit 411 calculates the infection risk R based on the average-waiting-time-in-a-queue Tavr of the queue and the average spacing D'avr of the queue according to Equation (7).

The mask detection unit 602 is capable of being realized through machine learning using a mask wearing image and a mask non-wearing image as teaching images. The present disclosure does not depend on a specific mask detection unit.

Figure 7:
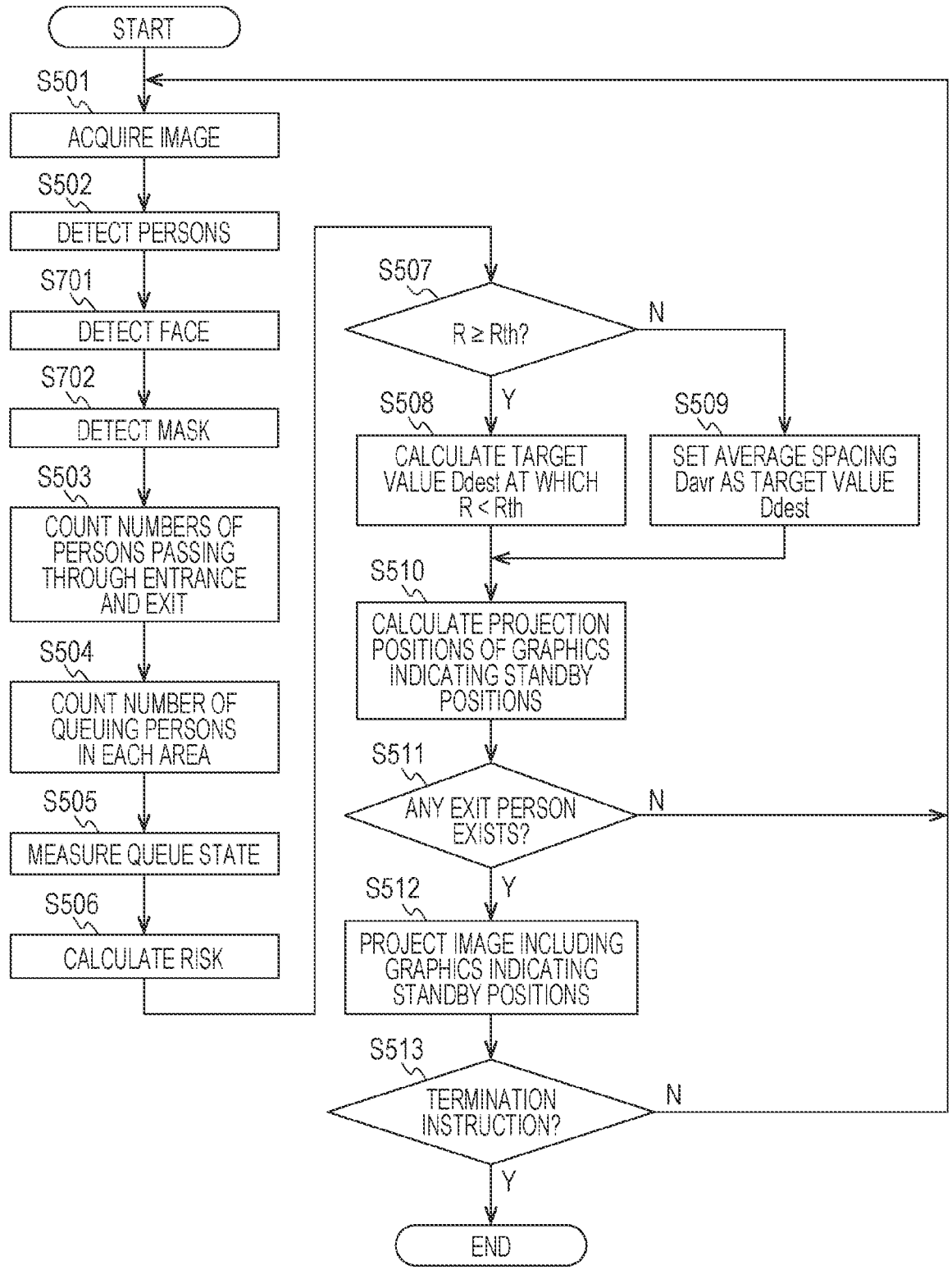
FIG. 7 is a flowchart illustrating a process of a queue analysis method according to the second embodiment.

FIG. 7 is a flowchart illustrating a process of a queue analysis method performed by the queue analysis apparatus 133 according to the second embodiment. Step S701 and Step S702 are added to the flowchart in FIG. 5 in the flowchart in FIG. 7. Step S701 and Step S702 are added between Step S502 and Step S503.

In Step S701, the face detection unit 601 detects the face area for each person detected by the person detection unit 403. In Step S702, the mask detection unit 602 detects whether the person in the face area detected by the face detection unit 601 wears the mask to detect the mask wearing ratio Cm of the persons in the queue.

In Step S505, the queue state calculation unit 109 calculates the average spacing D'avr of the queue based on the queue length L, the number-of-queuing-persons N, and the mask wearing ratio Cm according to Equation (6). In Step S506, the risk calculation unit 411 calculates the infection risk R based on the average-waiting-time-in-a-queue Tavr of the queue and the average spacing D'avr of the queue according to Equation (7). The remaining steps are the same as those in the first embodiment, The mask detection unit 602 detects the mask wearing ratio Cm of the persons in the queue, detected by the person detection unit 403. The image generation unit 412 controls the spacing between the graphics 121 to 125 so as to be increased as the mask wearing ratio Cm is increased according to Equation (6).

Third Modification

In a third modification, the mask detection unit 602 detects whether each person wears the mask at the entrance 101 of the queue. Then, as for a person who wears the mask, the image generation unit 412 generates an image in which the graphic indicating the standby position is displayed with the distance between the person and the person before the person being made shorter than a certain spacing. The certain spacing is the distance between a person who does not wear the mask and the person before the person who does not wear the mask. In this case, the person detection unit 403 continues tracking of the persons between the frames of the image. The same queue model as in the second embodiment can be used in the third modification. Equation (7) in the second embodiment can be used for the infection risk R of the queue.

It is necessary for the image generation unit 412 to generate the image of the graphic indicating the standby position for each person. The image generation unit 412 arranges the graphics 121 to 125 indicating the standby positions of the persons at equal intervals along the moving path, as in FIG. 1, and performs adjustment so that only the spacings between the graphics indicating the standby positions between the persons who wear the masks and the persons before the persons who wear the masks are made small, The mask detection unit 602 detects whether each person detected by the person detection unit 403 wears the mask. The image generation unit 412 performs control so that the spacing between the graphic indicating the standby position of the person who wears the mask and the graphic indicating the previous standby position is smaller than the spacing between the graphic indicating the standby position of the person who does not wear the mask and the graphic indicating the previous standby position.

The image generation unit 412 updates the image at the timing when the movement of the queue occurs. The image generation unit 412 may display the graphics 121 to 125 indicating the standby positions in red during standby, and may display the graphics 121 to 125 indicating the standby position in blue when the queue is movable and may concurrently change the display of the position to enable the queuing persons to intuitively know the movement timing. The image generation unit 412 may continuously move the graphics 121 to 125 indicating the standby positions to cause the queuing persons to move with their standby positions that are displayed.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiments) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-195091, filed Nov. 25, 2020, which is hereby incorporated by reference herein in its entirety.

What is claimed is:

1. A queue analysis apparatus comprising, a computer executing instructions that, when executed by the computer, cause the computer to function as:
    an acquisition unit configured to acquire an image of an area of a queue, which is captured by an imaging apparatus;
    a first detection unit configured to detect persons from the image acquired by the acquisition unit; and
    a control unit configured to control indications of standby positions of the queue so as to be displayed on a floor of the area of the queue so that a spacing between the indications of the standby positions of the queue is determined based on the persons detected by the first detection unit.

2. The queue analysis apparatus according to claim 1, wherein the instructions cause the computer to further function as:
    a calculation unit configured to calculate a waiting time in a queue based on the persons detected by the first detection unit,
    wherein the control unit controls the indications of the standby positions of the queue so as to be displayed on the floor of the area of the queue so that the spacing between the indications of the standby positions of the queue is determined based on the waiting time in a queue.

3. The queue analysis apparatus according to claim 2, wherein the control unit controls the spacing between the indications of the standby positions of the queue so as to be increased as the waiting time in a queue is increased.

4. The queue analysis apparatus according to claim 3, wherein the control unit controls a number of the indications of the standby positions of the queue so as to be decreased as the waiting time in a queue is increased.

5. The queue analysis apparatus according to claim 2, wherein the calculation unit calculates the waiting time in a queue from a difference between a time when each person passes through an entrance of the queue and a time when the person passes through an exit of the queue.

6. The queue analysis apparatus according to claim 2, wherein the calculation unit calculates a number of entrance persons of the queue based on a number of persons of the queue, which is currently detected, a number of persons of the queue, which was previously detected, and a number of persons passing through an exit of the queue between the current detection and the previous detected and, if the number of entrance persons has a positive value, calculates the waiting time in a queue from a difference between a time when each of the entrance persons enters the queue and a time when the entrance person passes through the exit of the queue.

7. The queue analysis apparatus according to claim 1, wherein the control unit controls a mark so as to be projected on the floor of the area of the queue.

8. The queue analysis apparatus according to claim 1, wherein the control unit controls a mark so as to be displayed in a display unit installed in or on the floor of the area of the queue.

9. The queue analysis apparatus according to claim 1, wherein the control unit controls part of a plurality of light emitting devices installed in or on the floor of the area of the queue so as to emit light.

10. The queue analysis apparatus according to claim 1, wherein the control unit controls an indication of permission of entrance to the area of the queue so as to be displayed on the floor of an area of an entrance in the area of the queue if a queue length is lower than a threshold value and controls an indication of inhibition of entrance to the area of the queue so as to be displayed on the floor of the area of the entrance m the area of the queue if the queue length is higher than or equal to the threshold value.

11. The queue analysis apparatus according to claim 7, wherein the mark includes a graphic, a letter, or a symbol.

12. The queue analysis apparatus according to claim 1, wherein the instructions cause the computer to further function as:
    a second detection unit configured to detect a mask wearing ratio of the persons in the queue, which are detected by the first detection unit,
    wherein the control unit controls the spacing between the indications of the standby positions of the queue so as to be increased as the mask wearing ratio is increased.

13. The queue analysis apparatus according to claim 1, wherein the instructions cause the computer to further function as:
    a second detection unit configured to detect whether each person detected by the first detection unit wears a mask,
    wherein the control unit controls the spacing between the indication of the standby position of the person who wears the mask and the indication of the previous standby position so as to be narrower than the spacing between the indication of the standby position of the person who does not wear the mask and the indication of the previous standby position.

14. A queue analysis method comprising:
    acquiring an image of an area of a queue, which is captured by an imaging apparatus;
    detecting persons from the acquired image; and
    controlling indications of standby positions of the queue so as to be displayed on a floor of the area of the queue so that a spacing between the indications of the standby positions of the queue is determined based on the detected persons.

15. A computer-readable non-transitory recording medium storing a program causing a computer to perform a queue analysis method, the method comprising:
    acquiring an image of an area of a queue, which is captured by an imaging apparatus;
    detecting persons from the acquired image; and
    controlling indications of standby positions of the queue so as to be displayed on a floor of the area of the queue so that a spacing between the indications of the standby positions of the queue is determined based on the detected persons.

* * * * *